Dec. 20, 1966 R. V. BURNS ETAL 3,293,371

TIMING ARRANGEMENT FOR MULTIFREQUENCY SIGNAL RECEIVERS

Filed Oct. 25, 1963 3 Sheets-Sheet 1

INVENTORS.
ROBERT V. BURNS
ROBERT T. CLEARY

BY

ATTY.

TIMING ARRANGEMENT FOR MULTIFREQUENCY SIGNAL RECEIVERS

Filed Oct. 25, 1963 3 Sheets-Sheet 2

INVENTORS.
ROBERT V. BURNS
ROBERT T. CLEARY
BY
A. A. Gulbrandsen
ATTY.

Dec. 20, 1966 R. V. BURNS ET AL 3,293,371

TIMING ARRANGEMENT FOR MULTIFREQUENCY SIGNAL RECEIVERS

Filed Oct. 25, 1963 3 Sheets-Sheet 3

INVENTORS.
ROBERT V. BURNS
ROBERT T. CLEARY

BY C. A. Gulbrandsen

ATTY.

United States Patent Office 3,293,371

Patented Dec. 20, 1966

3,293,371
TIMING ARRANGEMENT FOR MULTI-FREQUENCY SIGNAL RECEIVERS

Robert V. Burns, Markham, and Robert T. Cleary, Lockport, Ill., assignors to Automatic Electric Laboratories, Inc., Northlake, Ill., a corporation of Delaware Filed Oct. 25, 1963, Ser. No. 318,909
13 Claims. (Cl. 179—84)

Figures 1, 4:
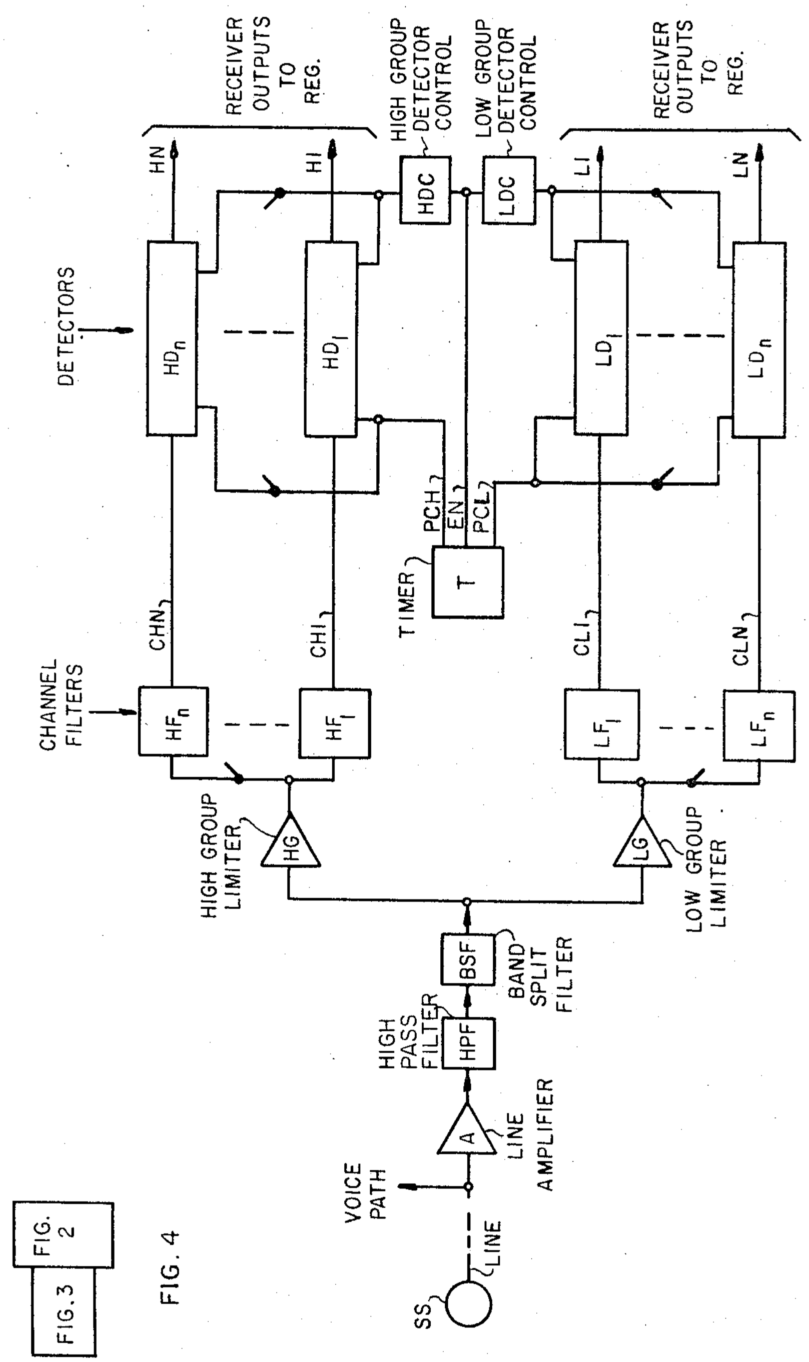

This invention relates to multifrequency signaling systems and more particularly to an arrangement for preventing signal simulation in multifrequency signaling systems, for example in telephone signaling systems.

Multifrequency signaling in telephone systems provides advantages over the well known interrupted direct current signaling. One of these advantages is the speed and accuracy with which a subscriber may operate a push button telephone subset. The push button subset permits a subscriber to dial a complete directory number before the last digits of that number are forgotten and reference to the directory listing is again required.

One signaling system of the multifrequency type is described by R. N. Battista, C. G. Morrison and D. H. Nash in their conference paper entitled, "Signaling Systems and Receiver for 'Touch-Tone' Calling," paper No. CP 62–226, published by the American Institute of Electrical Engineers, January 1962. The signaling system described is one in which multifrequency signal bursts each indicative of a digit are generated at a telephone substation and received by a signal receiver. This signal receiver separates the component frequencies of the signal bursts and indicates their presence to register apparatus. The signal receiver also includes apparatus for timing a minimum signal duration before allowing signals to be registered. This prevents the false indication of a digit due to other voice frequency signals in the transmission network, such as noise. At the end of this predetermined time interval the signal detecting apparatus is operated for an output interval determined by an output timer. If for some reason the signal burst is present after this output interval, the detecting apparatus is held operated until the signal disappears. The next digit may then be received.

As explained by T. H. Bennett et al., in their patent application Multifrequency Signal Receiver, Serial No. 318,576, filed October 24, 1963, the problem of noise is not limited to incoming noise which could possibly be accepted by the receiver as a valid digit. If for some reason frequency components have been received for a period of time in excess of the sum of the predetermined time interval and the output interval, and a loss of one of the frequency components due to noise occurs after the output interval, it is possible that this one valid signal may be interpreted by the receiver as two identical signals. More specifically, assuming that a digit, say five, had been dialed and the signal burst representing that digit was present at the receiver for a period in excess of the output timing interval, and assuming that a noise break occurred in at least one of the signal components after the output interval, signal reecivers heretofore known would respond to the return of that lost component as if it were a second digit identical in value to the first digit. This can occur if the return of the lost signal component is in excess of the predetermined time interval. In such a case the incorrect digits five-five would be registered instead of the correct digit, a single five.

The present invention differs from that described in the above Bennett et al. application in the tests that are applied by the timing arrangement in determining the validity of an interdigital pause. In that application, the timing arrangement at the end of a valid signal checks for the cessation of all frequency components for a predetermined interval, whereas in the present invention the check is made for the loss of any component frequency for a predetermined interval. This permits the receiver to reset to time the next digit even though a component frequency is still present due to noise or some mechanical failure in the tone generating apparatus. Also, by way of contrast, the present timing arrangement is independent of external control making the receiver applicable to different types of systems. For example, the present receiver may be employed in an originating register that accepts both dial pulses and tone signals, or it may be employed in a completely electronic exchange.

It is the object of the invention to provide an improved multifrequency signaling system.

Another object of the invention is to provide an improved multifrequency signal receiver.

A more particular object of the invention is to provide a new and improved signal timing arrangement for substantially preventing digit simulation due to incoming noise and due to noise breaks in any of the component frequencies of a valid signal.

A feature of the invention resides in the dual role of a timer circuit for timing both the first and second predetermined intervals.

The objects and features of the invention not specifically set forth will become apparent and the invention will best be understood from the following description taken in conjunction with the accompanying drawings.

In the drawings:

FIG. 1 is a block diagram representation of a multifrequency signaling system employing the present invention.

Figure 2:
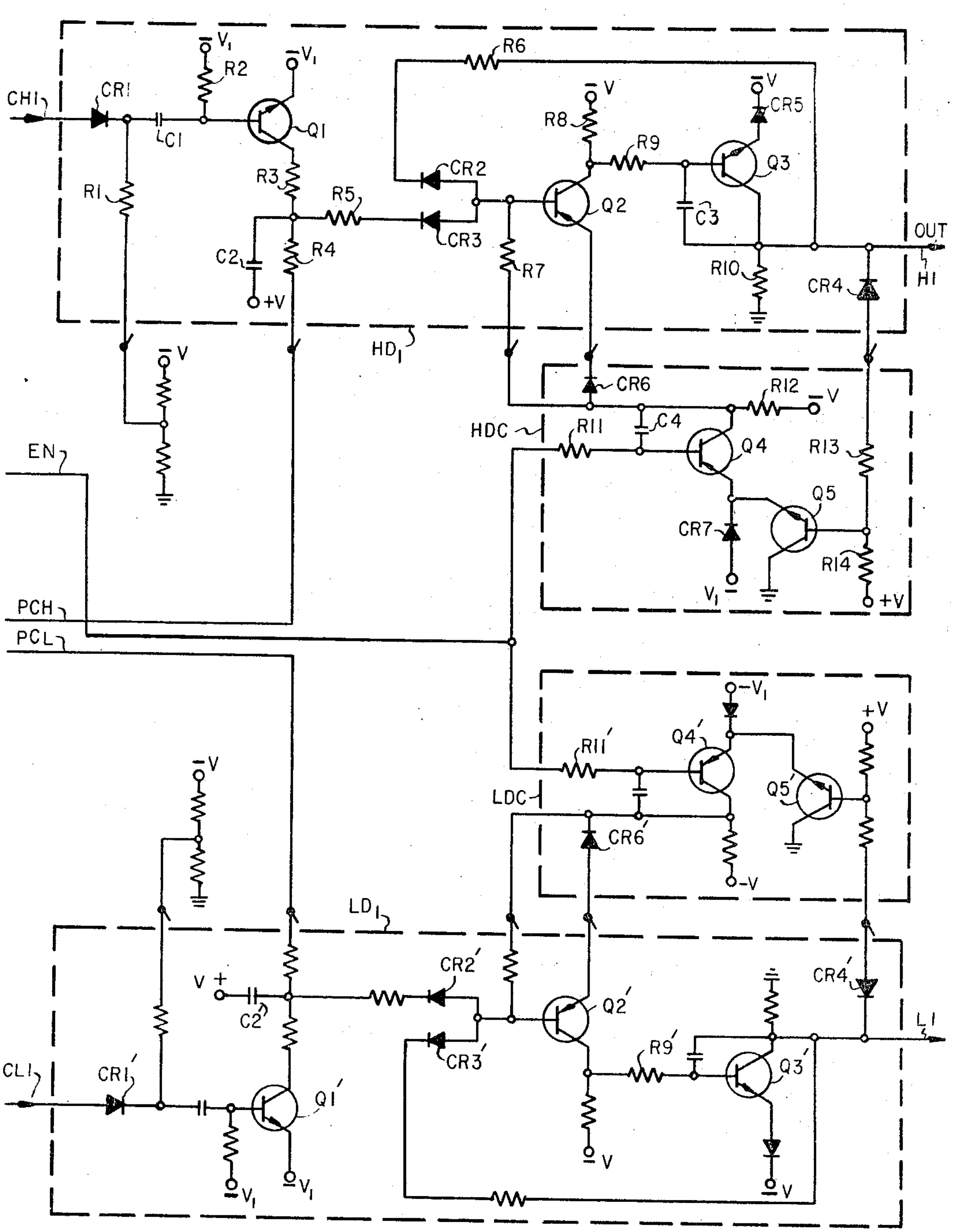
Figure 3:
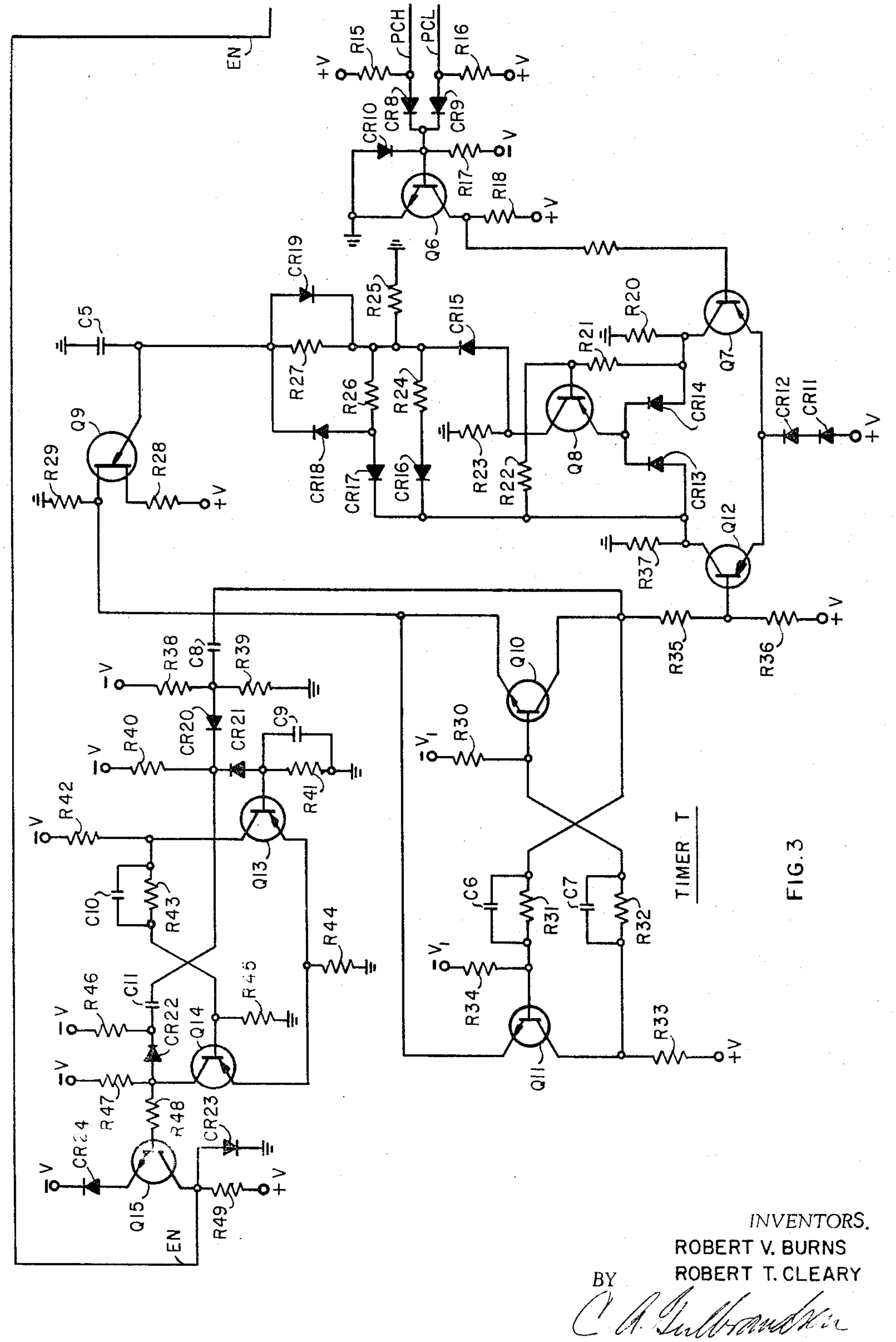

FIGS. 2 and 3 together form a circuit diagram of a portion of FIG. 1 and describe signal detection and timing according to the invention.

FIG. 4 shows the proper orientation to combine FIGS. 2 and 3.

Referring to FIG. 1, a substation SS is connected by its subscriber line to a signal receiver SR. Substation SS is of course of the multifrequency signaling type. The signals received by the signal receiver are first amplified by the line amplifier A and filtered by the high pass filter HPF before being divided into a high and low group by the band split filter BSF. The high group signals are extended to the high group limiter HG and the low group of frequencies are extended to the low group limiter LG. In each frequency group the signals are then separated into their individual frequency components by the channel filters $HR_1$ to $HF_n$ and $LF_1$ to $LF_n$ and are then detected by the corresponding group detectors $HD_1$ to $HD_n$ and $LD_1$ to $LD_n$. The operation of the components from the input to the detector portion of the signal receiver is similar to that described in the aforementioned conference paper. A more detailed description of that operation may be had by referring to those publications. The signal receiver also includes high and low group detector control circuits HDC and LDC, respectively, and a timer T and will be explained in more detail below.

Referring to FIGS. 2 and 3 arranged as shown in FIG. 4, the circuit representations and interconnections may be seen for the high group detector $HD_1$, the low group detector $LD_1$, the high group detector control HDC, the low group detector control LDC, and the timer T. It should be noted that since the configurations of the low and high group detectors and the low and high group detector control circuits are similar only the high group components have been fully referenced. The same references with an additional prime are used for some of the corresponding components in the low group components. For example, transistor Q2 of the high group detector $HD_1$ operates the same and has the same function as transistor Q2' in the low group detector $LD_1$.

On the left, the detectors each have an input from their corresponding channel filters as is shown in FIG. 1.

Assuming that a signal received has been split into a high and low group and has been determined by the channel filters to be of a frequency to energize detector $HD_1$ and detector $LD_1$, the operation of detector $HD_1$ is given, that of detector $HD_2$ being similar. Upon receipt of a signal component via connection CH1, diode CR1, having its cathode biased to a negative potential via resistance R1, transfers the negative peaks of the signal frequency to capacitor C1. These negative peaks pulse the base of transistor Q1 effecting a pulsed collector current. Capacitor C2 filters this pulsed D.C. collector current and the potential on connection PCH is pulled negative. Similarly the voltage on lead PCL is pulled negative. Connections PCH and PCL are connected to diodes CR8 and CR9, respectively, which with resistances R15 and R16 form an AND gate input to transistor Q6 keeping transistor Q6 normally on. Connection PCH is in multiple to all detectors in the high group and connection PCL is in multiple to all detectors in the low group. Therefore the AND gate input to transistor Q6 forms a signal checking circuit to determine if a signal comprises both a high group frequency and a low group frequency.

Transistors Q6 and Q7 having their electrodes biased so that they are normally conducting will be cut off by a true signal from the AND gate. In this particular embodiment a true signal would result from diodes CR8 and CR9 being reversed biased by negative signals on PCH and PCL. Initially transistor Q12 is conducting as will be explained below. Transistor Q8 is not conducting before an alleged valid signal is received since conducting transistors Q7 and Q12 both place essentially +V volts on the anodes of diodes CR13 and CR14 which have their cathodes connected to the emitter of transistor Q8 and also place essentially +V volts on the base of transistor Q8 by way of resistances R21 and R22. When a true signal is indicated by the AND gate, transistors Q6 and Q7 are turned off. Transistor Q8 is now biased to conduct. Ground is applied to the anode of diode CR14 and +V volts is applied to the anode of CR13 causing diode CR13 to conduct. Ground is also extended by way of resistances R20, R21 and R23 to the base and collector of transistor Q8. When transistor Q8 is turned on a D.C. path is established for charging capacitance C5 which may be traced as follows: +V potential, diodes CR11 and CR12, emitter of transistor Q12, collector of transistor Q12, diode CR13, emitter of transistor Q8, collector of transistor Q8, diode CR15, and resistance R27 in parallel with resistance R26 and diode CR18. The other side of capacitor C5 is connected to ground potential. At the end of a first predetermined interval, say 25 milliseconds, the charge on capacitor C5 is sufficient to fire the unijunction transistor Q9. This spike produced across R29 is extended through the emitters of transistors Q10 and Q11. These transistors form an emitter coupled flip-flop with transistor Q10 being the normally conducting transistor. The positive spike from the unijunction transistor turns off transistor Q10 which in a well-known manner turns on transistor Q11. As transistor Q10 turns off and its collector rises toward the source voltage +V, a positive voltage spike is extended by way of capacitor C8 to the base of transistor Q13. Transistors Q13 and Q14 form a monostable multivibrator with transistor Q13 conducting in the stable state. The positive voltage spike introduced at the base of transistor Q13 switches the multivibrator to an unstable state by turning off transistor Q13 which turns on transistor Q14. As transistor Q14 goes on its collector goes positive and turns on transistor Q15 which at its collector places a potential of substantially —V volts on connection EN for the unstable interval of the multivibrator. This unstable interval, say 45 milliseconds, is basically determined by capacitor C11 and resistance R40.

As connection EN is enabled for the unstable interval of the multivibrator, substantially —V volts is extended by way of connection EN to the bases of transistors Q4 and Q4′ of the high and low group detectors HDC and LDC, respectively. As previously explained each group detector control circuit is similar to the other and controls its own particular group of detectors. Therefore, only the high group will be explained.

Normally transistor Q4 is not conducting since connection EN is at essentially ground potential by virtue of diode CR23 in the collector circuit of transistor Q15. However, as just stated, the EN connection is enabled with a potential of essentially —V volts during the unstable state of the multivibrator. This negative voltage introduced to the base of transistor Q4 turns that transistor on, which in turn places approximately ground potential on the emitter of transistor Q2. The charge on capacitor C2 will then enable transistor Q2 by way of resistor R5 and diode CR3. It should be noted that no other transistor Q2 in the high group can operate since only capacitor C2 of the particular detector circuit had been charged by its corresponding frequency component. Q2 furnishes operating bias for transistor Q3 which also turns on. The operation of transistor Q3 places essentially —V volts on the common connection between diode CR4 and resistance R14 to all detectors of the group. This negative voltage causes transistor Q5 to turn off and place, say —8 volts on the emitter of transistor Q4. Transistor Q4 is still conducting but its collector and therefore all the emitters of transistors Q2 in that group are now at this —8 volts. This prevents operation of any other detector during read out since capacitor C2 of each detector cannot go more negative than this same voltage. Therefore, only one detector of each group may have an output. In general the output of each detector may be connected to suitable register apparatus.

Returning now to the instant when the flip-flop (Q10, Q11) changed from the normal state to its opposite state, the voltage rise of the collector of transistor Q10 is also felt at the base of transistor Q12 which is normally conducting. This positive going potential also turns off transistor Q12. This again balances the base-emitter bias condition of transistor Q8 and turns off transistor Q8, since transistor Q7 is off and ground potential is extended via resistances R20 and R37 to the anodes of diodes CR13 and CR14. Ground potential is also extended to the base of transistor Q8 by resistances R21 and R22. It should suffice here to say that when a frequency component is no longer present to the input of its corresponding detector circuit that the transistor Q1 of that detector is turned off and a corresponding lead PCH or PCL no longer has a negative potential thereon. If this situation should occur, that is the loss of one of the frequency components, a true AND condition no longer exists at the base of transistor Q6 and transistor Q6 and therefore transistor Q7 turn on.

Assume first that the above condition exists while transistor Q12 is still conducting, that is at a time before the firing of transistor Q9 after the first timing interval. It should be understood that when transistor Q7 again conducts, there again exists a balance to the input of transistor Q8 which turns transistor Q8 off opening the charging path for capacitor C5. Capacitor C5 would then discharge through resistances R27 and R25. The longer the discharge time, there is less effect on signaling due to noise breaks. If the signal is indeed a valid signal suffering from a noise break, the return of the signal will again turn off transistors Q6 and Q7 and turn on transistor Q8 to again begin the first predetermined timing interval.

Now assume that the first predetermined time interval is over, transistor Q9 has fired, and the bistable multivibrator has been switched from its normal state. This effectively means that a signal having two valid frequency components has been received for a time interval that is sufficient to recognize the signal as a valid signal for registration and the monostable multivibrator is triggered so that the detectors may so indicate to the signal registering equipment (not shown). However, as previously stated, noise still presents a problem in the form of noise breaks after a signal has been determined to be of a sufficient time length. If a disappearing signal is actually the end of a signal or a noise break occurring within the signal, the absence of the signal must be timed for a second predetermined interval. As previously explained, with the flip-flop switched from its normal state to its operated state, transistor Q12 is turned off. Also, at the end of the first timing interval, transistor Q7 is off and transistor Q8 is off because of the balance afforded to its input circuit by transistors Q7 and Q12. The absence of a valid signal will be indicated by the removal of negative potential from connection PCH or connection PCL or from both of these connections. When either of these conditions exist, transistors Q6 and Q7 again turn on. This creates an unbalance across the base-emitter input circuit of transistor Q8 and turns that transistor on to again complete a charging path for capacitor C5. This charging path is essentially the same as previously traced except that it now traverses transistor Q7 instead of transistor Q12, and also, since transistor Q12 is not conducting, the ground potential at resistance R37 allows a current flow from the charging path through resistance R26 and diode CR17, thereby diverting from the former path through diode CR18 which had placed resistance R26 in parallel with R27. This timing interval is therefore longer than the first timing interval, say 45 milliseconds. When capacitor C5 again has sufficient charge transistor Q9 will fire and reset the flip-flop turning off transistor Q11 and turning on transistor Q10. The collector of transistor Q10 now moves toward ground potential causing transistor Q12 to again turn on. The monostable multivibrator of course is not affected by this potential shift since it is of opposite polarity than is required to change the state of transistor Q13. As transistor Q12 again turns on the balance afforded to the base circuit by transistor Q12 and transistor Q7 is again established and transistor Q8 turns off. The timer is now reset for the next digit. If the AND function is again made present to the base of transistor Q6 during this second timing interval, the off time of the signal will be recognized as a noise break, transistors Q6 and Q7 will again turn on and transistor Q8 will turn off. However, a much faster discharge of capacitor C5 is now available through resistances R25 in parallel with resistances R24, R26 by way of diodes CR16, CR17 and resistance R37.

The detectors and the timing circuit have now checked to see if a signal burst comprised a frequency component of a high group and a frequency component of the low group, determined that the signal duration was sufficient to be recognized as a valid digit, furnished an output to register equipment for a predetermined time, and then checked to see if the signal has ended for a predetermined time interval. The first timing interval has rejected invalid signals comprising valid signal frequencies which were of too little time duration to be recognized as a valid signal. The second timing interval has prevented a second identical digit from being registered when only one digit including a noise break had been dialed.

Many changes and modifications may be made in the invention by one skilled in the art and should be included in the appended claims.

What is claimed is:

1. A signal receiver for sensing signal bursts, each of said bursts comprising frequencies from a plurality of frequency groups, said receiver comprising: means for separating said signal bursts into the individual component frequencies; means associated with said separating means for detecting said components, said detecting means including component sensing means and output means; and means connected to and controlled by said component sensing means for timing a predetermined interval upon the coincident receipt of said component frequencies and for timing a second predetermined interval upon the loss of any one of said component frequencies.

2. A signal receiver for sensing signal bursts, each said signal burst comprising frequencies from a plurality of frequency groups, said receiver comprising: means for separating said signal bursts into the individual component frequencies; means for detecting said frequencies including output means; means connected to and controlled by said detecting means for timing a predetermined interval upon receipt of said component frequencies, and for timing a second predetermined interval upon the loss of any one of said component frequencies; and second timing means connected to and controlled by said first timing means for enabling said output means for another predetermined interval.

3. A signal receiver, as claimed in claim 2, and further comprising means connected to and controlled by said first timing means for conditioning said first timing means to said first and second predetermined time intervals.

4. A circuit for timing signals having a plurality of individual signal components to determine duration validity and loss validity of said signals, said circuit comprising:

a signal input circuit including a plurality of inputs and an output, said input circuit operated in response to the conjunct application of said signal components to said plurality of inputs, timing means including a plurality of inputs and an output, said timing means operable to time a first predetermined interval to determine duration validity and a second predetermined interval to determine loss validity of said signals, timing control means including a plurality of inputs and an output, said output connected to one of said inputs of said timing means and one of said inputs connected to said output of said signal input circuit, and time set means including an input and an output, said input connected to said output of said timing means and said output connected to another of said inputs of said timing control means, said time set means operated by said timing means at the end of each of said predetermined intervals, said timing control means controlled by said time set means and the operation of said signal input circuit upon said conjunction application of signal components to condition said timing means to time said first predetermined interval and controlled by said time set means and the unoperated condition of said signal input circuit upon the loss of a signal component to condition said timing means to time said second predetermined interval.

5. The circuit according to claim 4, wherein said timing control means is a bridge circuit.

6. The circuit according to claim 5, wherein said bridge circuit has a pair of diode legs and a pair of resistance legs, said diode legs being connected between said inputs in a manner to provide a unidirectional output when said bridge is unbalanced.

7. A circuit for timing a predetermined signal duration and a predetermined intersignal interval comprising:

an R-C timing network having a plurality of inputs and an output, said network including means for setting the time constant of said network connected to one of said network inputs;

a bistable circuit having an input and a plurality of outputs;

first switch means interposed between said timing network output and said bistable circuit input for controlling the condition of said bistable circuit in response to a predetermined charge of the capacitance portion of said R-C network;

second switch means having an input connected to one of said bistable outputs and a plurality of outputs one of which is connected to said one input of said timing network, said second switch means operated to close and open in accordance with the states of said bistable circuit for operating said network control means, said network control means setting the time constant of said network to one value for timing a predetermined signal duration and to another value for timing a predetermined intersignal interval;

a bridge circuit having a plurality of inputs and an output, one of said inputs being connected to another of said outputs of said second switch means;

third switch means having an input connected to said bridge circuit output and an output connected to another of said timing network inputs; and fourth switch means having an input and an output, said output being connected to another of said inputs of said bridge circuit, said fourth switch means being controlled by the receipt and loss of signals to control said third switch means.

8. The circuit according to claim 7, wherein said third switch means opens and closes a charging path for said capacitance portion of said R-C network and wherein said network has a plurality of discharge time constants selectively controlled at said one network input by said second switch means in accordance with the state of said bistable circuit.

9. A signal receiver for identifying multifrequency signal bursts, said receiver comprising: a plurality of frequency selective means for separating said signal bursts into their individual frequency components; a plurality of detector circuits divided into at least two groups and each individually associated with separate ones of said frequency selective means, each said detector circuit including a signal detecting portion and a signal indicating portion connected thereto; a timer having a plurality of inputs, one from each said detector group, and an output commonly connected to each said detector signal indicating portion, said timer including means for timing a predetermined interval upon receipt of said signals; and time set means for conditioning said timing means to time a second predetermined interval upon the loss of said signals.

10. A signal receiver, as claimed in claim 9, wherein said timer further includes a second timing means having an input connected to said time set means and an output being connected to said common timer output, said second timing means being controlled by said time set means to enable said signal indicating portions of said detectors for another predetermined time interval.

11. A signal receiver, as claimed in claim 10, and further comprising a plurality of detector group control means each interposed between said common timer output and the detector indicating portions of its associated detector group, each said group control means being operated by said timer to enable the indicating portion of a detector that is detecting a signal and conditioning all other detector indicating portions in that group inoperable.

12. A signal receiver for identifying multifrequency signal bursts, said receiver comprising:

a plurality of frequency selective means for separating said signal bursts into their individual frequency components;

a plurality of detector circuits divided into at least two groups and each individually associated with separate ones of said frequency selective means, each said detector circuit including a signal detecting portion and an output portion;

a logic circuit having a plurality of inputs each being a common connection from said signal detecting circuits of separate detector groups, said logic circuit having an output, said logic circuit being enabled by coincident operation of at least one detecting circuit of each said group;

an R-C timing network having a plurality of inputs and an output, said network having means controlled over one of said inputs for changing the time constant of said network;

a bistable circuit having a plurality of outputs and an input;

first switch means having an input and an output, said first switch means interposed between said input to said bistable circuit and said timing network output and operated in response to a predetermined charge of the capacitance portion of said R-C network for controlling the condition of said bistable circuit;

second switch means having an input and a plurality of outputs, said input being connected to one of said outputs of said bistable circuit and one of said outputs being connected to said one input of said network for controlling the time constant of said network, said second switch means operated to control said time constant changing means in accordance with the state of said bistable circuit for timing a first predetermined interval of a signal burst when said bistable circuit is in one of its states and for timing a second predetermined interval when said bistable circuit is in the other of its states;

a bridge circuit having a plurality of inputs and an output, one of said inputs being connected to another of said outputs of said second switch means;

third switch means having an input connected to the output of said bridge circuit and an output connected to another of said network inputs;

fourth switch means having an input connected to the output of said logic circuit and an output connected to another of said bridge circuits' inputs, said fourth switch means controlled by the operation of said logic circuit for controlling said third switch means, said third switch means being operated to establish a charging path for said timing network.

13. A signal receiver, as claimed in claim 12, and further comprising:

a monostable circuit having an input connected to another of said bistable circuit outputs and an output commonly connected to said plurality of detector signal output portions, said monostable circuit being triggered from its stable state by said bistable circuit; and a plurality of detector group control means each interposed between said common output of said monostable circuit and the output portions of the detector circuits of the associated detector group, said detector group control means being operated by said monostable circuit to enable the output portions of said detector circuits that are detecting signals and to prevent the other said detector circuits from operating.

References Cited by the Examiner

UNITED STATES PATENTS 3,128,349 4/1964 Boesch et al. ---------- 179—84

KATHLEEN H. CLAFFY, *Primary Examiner.*

H. ZELLER, *Assistant Examiner.*